(12) United States Patent
Van De Runstraat et al.

(10) Patent No.: US 8,791,176 B2
(45) Date of Patent: Jul. 29, 2014

(54) PROCESS AND APPARATUS FOR CARRYING OUT MULTI-PHASE REACTIONS

(75) Inventors: Annemieke Van De Runstraat, Zoetermeer (NL); Peter Geerdink, Leiden (NL); Earl Lawrence Vincent Goetheer, Westdorpe (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 429 days.

(21) Appl. No.: 12/996,422

(22) PCT Filed: Jun. 10, 2009

(86) PCT No.: PCT/NL2009/050322
§ 371 (c)(1),
(2), (4) Date: Jan. 20, 2011

(87) PCT Pub. No.: WO2009/151322
PCT Pub. Date: Dec. 17, 2009

(65) Prior Publication Data
US 2011/0112216 A1 May 12, 2011

(30) Foreign Application Priority Data
Jun. 10, 2008 (EP) .................................. 08157978

(51) Int. Cl.
*B01F 3/08* (2006.01)
(52) U.S. Cl.
USPC ............................ 523/313; 523/319; 523/324
(58) Field of Classification Search
USPC ......................................... 523/313, 319, 324
See application file for complete search history.

(56) References Cited

U.S. PATENT DOCUMENTS 6,399,031 B1   6/2002   Herrmann et al.
6,569,961 B1 *  5/2003   Adams ............................ 526/64

FOREIGN PATENT DOCUMENTS

EP   1157738 A   11/2001
EP   1632277 A   3/2006
WO   99/15266 A   4/1999

OTHER PUBLICATIONS

Saxena, A.K. et al., "Coiled Configuration for Flow Inversion and Its Effect on Residence Time Distribution", Aiche Journal 30: 363-368, May 1984.
Naphon, P. et al., "A review of flow and heat transfer characteristics in curved tubes", Renewable and Sustainable Energy Reviews 10: 463-490, Oct. 1, 2010.
International Search Report issued in PCT/NL2009/050322 and dated Sep. 22, 2009.

* cited by examiner

*Primary Examiner* — Edward Cain
(74) *Attorney, Agent, or Firm* — Lucas & Mercanti, LLP

(57) ABSTRACT

The invention is directed to a process and apparatus for carrying out reactions with reaction mixtures comprising different physical phases. In a first aspect, the present invention is directed to a process for carrying out chemical reactions comprising a step wherein a reaction mixture comprising at least two different physical phases, wherein at least one of these phases being liquid, is subjected to the action of Dean vortices, which Dean vortices result from said liquid flowing through a channel having at least two curvatures, wherein the channel comprises for at least a fraction of its total length a smooth inner surface.

12 Claims, 2 Drawing Sheets

PROCESS AND APPARATUS FOR CARRYING OUT MULTI-PHASE REACTIONS

CROSS-REFERENCE TO RELATED APPLICATIONS

This application claims the benefit of European Patent Application No. 08157978.1 filed Oct. 6, 2008 and International Application No. PCT/NL2009/050322 filed Jun. 10, 2009, the contents of each of which are incorporated herein by reference.

The invention is directed to a process and apparatus for carrying out reactions with reaction mixtures comprising different physical phases.

Although for most chemical reactions, continuous operations would give the best results with respect to process stability, process control and product quality, there are still numerous cases when continuous operations are not possible or have major disadvantages. Examples of these processes are highly exothermic or endothermic reactions or processes where the reactants and/or products are in different physical phases.

For continuous processes carried out in a tube reactor the mixing in radial direction is often poor and may be enhanced by using static mixers. However, using static mixers has the disadvantage that axial mixing is also enhanced, which results in the reaction time along the reactor tube not being uniform, which may result in a lower product quality. Moreover, the pressure drop along the tube is enhanced and in case of some type of reactions, in particular polymerization reactions, plugging of the reactor could occur due to enhanced coagulation and/or particles sticking to the internals.

U.S. Pat. No. 6,399,031 describes a curved tubular flow reactor comprising a plurality of successive bends having alternating directions of curvature. This curved tubular flow reactor has the advantage of carrying out liquid-phase chemical reactions, especially polymerization reactions, continuously. U.S. Pat. No. 6,399,031 refers to an arrangement described by Saxena and Nigam (A. K. Saxena and K. D. P. Nigam, AIChE Jl., 30 (1984) 363-368), which is a flow inverting heat exchanger. Multiphase chemical reactions are not disclosed in these documents.

WO-A-2006/025741 describes a crystallization process that can be operated in a continuous fashion, in which a liquid comprising a solvent and material dissolved therein and optionally heterogeneous particles is subjected to crystallization conditions in the presence of Dean vortices. Chemical reactions in the sense of transformation of molecules is not disclosed in this document. The same holds for WO-A-99/15266, where a precipitation method in which a suspension is led through a pipe reactor which may include one or more coil sections is disclosed. Moreover, the coil sections seems to be directed at saving space rather than inducing intensified transfer processes by Dean vortices.

It is an object of the present invention to provide a process for carrying out chemical reactions in a multi-phase (viz. two or more different physical phases, in particular liquid, solid and/or gas) reacting mixture, which process can be operated in a continuous fashion and thus provides for the above-mentioned advantages for continuous processes.

In a first aspect of the invention, this objective is met by carrying out said multi-phase reactions in the presence of so-called Dean vortices, which are formed due to the non-pulsating flow of the feed through a curved channel, which channel has a smooth surface in order to facilitate the formation of the Dean vortices, thereby preventing turbulent flow, even if the feed comprises compounds in two or even more physical phases (e.g. gas bubbles, micelles, solid catalytic particles, etc. in a liquid environment). Thus in a first aspect, the present invention is directed to a process for carrying out chemical reactions comprising a step wherein a reaction mixture comprising at least two different physical phases, wherein at least one of these phases being liquid, is subjected to the action of Dean vortices, which Dean vortices result from said liquid flowing through a channel having at least two windings, wherein the channel comprises for at least a fraction of its total length a smooth inner surface.

Figure 1:
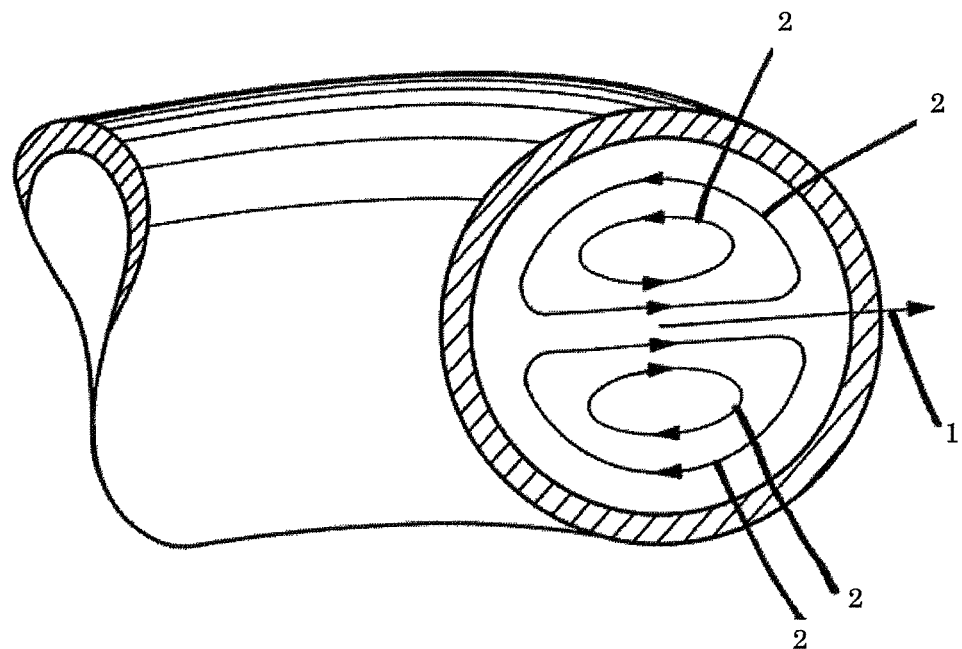
FIG. 1 is a schematic cross-section of a curved channel in accordance with the invention, in which arrow 1 gives the direction of the centripetal force and arrow 2 indicates that streamlines of the secondary flows that occur as a result of the centripetal forces.

As is set out in WO-A-2006/025741 and also in P. Naphon and S. Wongwises, Renewable and Sustainable Energy Review, 10 (2006) 463-490, when a fluid flows through a curved channel, in particular a channel in the form of a spiral, secondary flows occur as a result of the centripetal forces (see FIG. 1, in which arrow 1 gives the direction of the centripetal force and 2 are the streamlines of the secondary flow that results). These flows, that are in principle directed perpendicularly with respect to the flow direction through the channel, are known as Dean vortices. The intensity of these vortices may be related to the Dean number, De, which is defined as:

$$De = Re \cdot \sqrt{(D_i/D)} \qquad (1)$$

wherein:

$Re = \rho \cdot \upsilon D_i / \eta$ (Reynolds number);

$D_i$ is the inner diameter of the channel (for channels having a non-circular cross-section, the hydraulic diameter) (m);

$D$ is the hart-to-hart diameter of the curvature of the channel (m);

$\rho$ is the density of the fluid (kg/m$^3$);

$\upsilon$ is the average fluid velocity through the channel (e.g. the flow rate in m$^3$/s divided by the cross-sectional area in m$^2$); and $\eta$ is the dynamic viscosity of the fluid (Pa·s).

Figure 3:
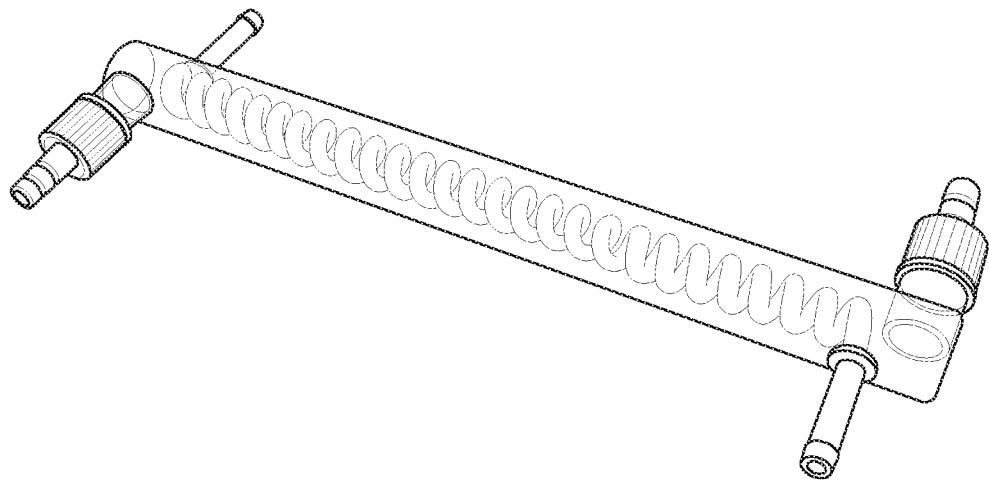
FIG. 3 is shows one module of an apparatus including a spiraled tube made of glass in accordance with the invention.

The channel is typically a tube, preferably with circular or elliptic cross section. An example set-up is shown in FIG. 3, which shows one module of an apparatus for use in the present invention. It comprises a spiraled tube made of glass having about 27 windings.

It was found that the above-mentioned Dean vortices have a very favorable effect on the multi-phase reaction process. Without wishing to be bound by theory, it is assumed that this is the result of the radial mixing that occurs due to the Dean vortices. As a result, the flow through the channel becomes more or less plug flow, which results in each volume element that enters the reactor having the same or essentially the same residence time, which in turn results in a product having uniform properties.

In laminar flow (i.e. low values of Re) through a straight tube the molecules near the wall have a lower velocity than those in the center of the tube. Increasing the flow rate (higher value of Re) may cause turbulent flow. In turbulent flow both radial and axial mixing occur and the volume elements in turbulent flow therefore have more uniform residence times than laminar flow. However, plug flow is still not obtained in turbulent flow, because of axial mixing. Furthermore, a disadvantage of turbulent flow is that the pressure drop along the tube is much larger than it is for laminar flow. In the channel of the present invention plug flow is established by good axial mixing, while the flow is maintained laminar, giving the advantage of a relatively low pressure drop. These relatively low flow rates enable longer residence times without the need for the use of extremely long tubes. It has been shown experimentally that in this way reduction of energy usage can be attained.

An extra advantage is obtained when a multitude of curvatures are present, in particular when the reactor has the shape of a spiral (or helix), viz. a multitude of windings each having substantially the same winding diameter, D. Using a spiral may result in an increase of Re at which turbulence sets on ($Re_{onset}$). In particular a spiral having D equal to 100 times $D_i$ or less, preferably 10 or less, results in a considerable increase of the Re number at which turbulence commences, e.g. at $Re_{onset}$=6000 when D=50×$D_i$, or $Re_{onset}$=7600 for D=15×$D_i$. The number of windings present in such a spiraled reactor is preferably 2 to 10 000 more preferably 4 to 1000. Again, without wishing to be bound by theory it is assumed that the Dean vortices result in an excellent mixing in radial direction, combined with low mixing in axial direction.

The multi-phase reacting mixture may contain two or more physical phases, wherein at least one of these phases being liquid. Non-limiting examples of two-phase reacting mixtures are emulsions, suspensions, sols and foams. A non-limiting example of a three-phase reacting mixture is a gas-in-liquid suspension in the presence of a solid catalyst particle. The present invention may also be used in the field of biotechnology. Non-limiting examples are reacting mixtures containing yeast, enzymes or bacteria.

The reaction mixture may be multi-phased at the start of the reaction (e.g. solid particles that catalyze a reaction in the liquid phase), or become multi-phased during the reaction (e.g. a reaction in the liquid phase under the formation of gaseous product).

Examples of reactions that are supported by the present invention are heterogeneous catalysis, extraction, phase transfer catalysis, emulsion polymerization and three phase systems such as hydrogenation in the presence of a catalyst, oxidation in the presence of a catalyst or hydroformylation in the presence of a catalyst.

From experiments conducted with two differently colored liquids, it was found that the Dean vortices were formed already after two windings in a spiraled reactor. Therefore, the shape of the reactor may be chosen freely, but most preferably at least two windings are present therein. In practice, it is preferred to have a multitude of windings, e.g. 10 or more, such as 50-200, or more. Although spirally wound curvatures as described in the preceding paragraph are preferred, the present invention is not limited thereto. For instance, sinusoidal channels, e.g. those described in U.S. Pat. No. 6,399,031 can be used equally well in the present invention. Also the other configurations known from U.S. Pat. No. 6,399,031 can be used successfully in accordance with the present invention.

The inner diameter $D_i$ is preferably larger than 0.5 mm, more preferably larger than 1 mm. For values of $D_i$ smaller than 0.5 mm, capillary action may hamper the formation of Dean vortices. The inner diameter $D_i$ is preferably smaller than 10 cm, more preferably smaller than 3 cm. For values of $D_i$ larger than 10 cm, Dean vortices may have difficulty to form.

Furthermore, the diameter of the curvature of the channel D is preferably smaller than 30 cm. Dean vortices may have difficulty to form at values larger than this value. The maximum values of D and $D_i$ have important consequences for scaling up the reaction. One cannot simply build a large reactor, because D or $D_i$ might be too large and no Dean vortices would form.

In general, it is preferred that the ratio Di/D is at least 0.1, more preferably at least 0.2.

Beneficial effects on product control were found when the inner wall of the curved channels is smooth. Without wishing to be bound by theory, it is assumed that in that case the Dean vortices are more easily formed. Reactions carried out in more than one physical phase may also distort the formation of Dean vortices. For example, gas-bubbles, micelles or small solid particles (e.g. catalyst particles) can cause the flow to become turbulent and/or inhibit the formation of Dean vortices. By using channels with a smooth inner surface, the Dean vortices are more easily formed and can be more easily maintained. It was found that by increasing the smoothness of the inner surface the particle size distribution of solid reaction products was minimized. Without wishing to be bound by theory, it is assumed that apart from the above improved formation and maintenance of Dean vortices, irregularities in the inner surface of the curved channels create dead spaces, where the effect of the Dean vortices is decreased. Particles or reactants can get stuck in these dead spaces, thereby increasing the time they spend inside the reaction channels. Moreover particles may adhere to the reactor wall and thus start blocking the reactor. Thus, as a result, the spread in residence time for particles and reactants is enlarged, which leads to a broadening of particle size distribution and/or less uniform product. Therefore, the inner surface of the channels has to be as smooth as possible in order to obtain particles with a small particle size distribution or product with a narrow range of properties.

Roughness of a surface can be quantified by the vertical deviations of a real surface from its ideal form. This can be expressed in a surface roughness ($R_a$) value, which is the arithmetic average of the roughness profile of a surface. If the vertical deviations are large (i.e. the surface is rough), the $R_a$ value will be large; if the vertical deviations are small (i.e. the surface is smooth), the $R_a$ value will be small.

As a rule of thumb, a maximum relative roughness $R_{a,r}$ of 0.1 is assumed. The maximum roughness $R_a$ can then be deduced from:

$R_a = R_{a,r} \cdot \delta_\upsilon$
$\delta_\upsilon = \eta_k / \upsilon_f$
$\upsilon_f = \sqrt{\tau/\rho}$
$\tau = \eta (dv_w/dy)_{y=0}$ In which:
$\delta_\upsilon$ is the viscous length (m);
$\eta_k$ is the kinematic viscosity of the fluid in (m²/s);
$\upsilon_f$ is the friction velocity (m/s);
$\tau$ is the wall shear stress
$\rho$ is the fluid density (kg/m³);
$\eta$ is the dynamic viscosity (Pa·s);
$v_w$=flow velocity parallel to the wall (m/s) and;
y=distance to the wall (m);

Usually, $v_f$ is estimated using numerical simulations. However, according to Quadrio (M. Quadrio, S. Sibilla, Journal of Fluid Mechanics, 424 (2000) 217-241) $v_f$ can be estimated by $v_f = v/14$, in which $v$ is the bulk velocity (m/s). As an example, for a watery fluid this leads to a maximum roughness of 20 nm. Glass is a substance that is naturally smooth ($R_a = 3$ nm) and is therefore a very suitable material for the inner surface of the channels in the present invention. Stainless steel may also be used as the inner surface of the channel. For example, stainless steel alloy 316L can have a surface roughness as small as 10-20 nm. Applying a coating to smoothen the inner surface of the channel may also be used in order to reach the desired smoothness.

The channel comprises for at least a fraction of its total length a smooth inner surface as defined above. Said fraction comprises preferably at least 2 windings, more preferably at least 20 windings and even more preferably all windings of the channel. Most preferably the entire length of the channel has a smooth inner surface.

The multi-phase reacting mixture should preferably be moved through the channels in a non-pulsating way. This can be done by for instance a non-pulsating pump or applying gas pressure using a pressurized feed vessel with a dosing valve. The latter is especially suited for multiphase reactions including a gas phase. Making a pump non-pulsating can be achieved by placing a pressure vessel between the pump and the channels to build up a constant continuous pressure. Using pulsating pumps (e.g. pistons or membrane pumps) directly to pump the multi-phase reaction mixture through the curved channels, results in the flow rate not being constant throughout the reactor. This fluctuating flow rate has a negative effect on the formation of Dean vortices and increases turbulence effects resulting in adverse consequences such as increase in coagulation through particle collision and decrease in residence time uniformity.

In one specific embodiment, the process according to the present invention can be used for emulsion polymerization, in which very small emulsion droplets are formed, herein also referred to as "mini-emulsions". Droplets of monomer (oily phase) with an initiator molecule are produced typically by emulsification using surfactants and hydrophobic molecules as co-surfactant in a continuous phase of water or an aqueous solution. The mini-emulsion particles are only a few nanometers in size and can be made with a very small size distribution. Preferably, exactly one initiator molecule is present per mini-emulsion particle. Each mini-emulsion particle is essentially a minireactor, in which no transport of monomer into or out of the particle occurs. Polymerization starts when the particles are brought onto the reaction temperature. Using the process of the present invention, the intensity of the collision of the emulsion particles with other emulsion particles in the reactor is minimized by a smooth surface and non-pulsating flow which prevents coagulation. Furthermore, the Dean vortices prevent the viscous miniemulsion particles from clogging the walls of the reactor channel. Moreover, the agglomeration of viscous miniemulsion particles is reduced. Therefore, the initial small size distribution of the emulsion particles is maintained throughout the reaction process, resulting in an end product of very high quality and a very small polymer particle size distribution.

In another embodiment, the process according to the present invention can be used in reaction processes in which compounds are present in liquid, gas and solid phase. Non-limiting examples of this type of reaction are oxidations, hydrogenations and hydroformylations. It was found that the above-mentioned Dean vortices have a very favorable effect on keeping solid-phase particles into suspension. Moreover, agglomeration of particles is suppressed. This is especially important in heterogeneous catalysis where the exposed surface area of the catalyst particles plays a vital role in reactivity and selectivity. For optimal control, the exposed catalyst surface should be constant along the reactor length. Using the process according to the present invention, the flow in the reactor is prevented from becoming turbulent, despite the presence of gas and solid particles. Dean vortices are maintained, resulting in high quality products.

Hydrogenation in accordance with the present invention typically comprises feeding a liquid hydrocarbon feed to the entry of the spiraled tube, which already comprises gas suspended therein or to which a gas stream is added in the spiraled tube, e.g. by means of a capillary injector. In the liquid feed solid catalyst particles can be suspended. It is also possible to use homogeneous catalysis, in which case the catalyst can be dissolved in the liquid feed or added thereto at a point inside the reactor.

Hydroformylation can be carried out in a similar way as described above for hydrogenation. The way of introducing the liquid and gas reactants is the same as is the way catalysts are used. However, in case of hydroformylation the gas phase comprises hydrogen and carbon monoxide.

Oxidation can be carried out in a similar way as described above for hydrogenation. The way of introducing the liquid and gas reactants is the same as is the way catalysts are used. However, in case of oxidation the gas phase comprises oxygen or air.

In another embodiment, the process according to the present invention can be used in reaction processes in which the liquid flow is or becomes very viscous. A higher viscosity means a lower Re, thus a decrease in the intensity of the Dean vortices (De). The present invention provides a way to maintain the Dean vortices more easily and thus can be used for fluids with higher viscosity. In practice, liquids may be used with a viscosity up to 10,000 Pa·s (measured at the reaction temperature using a Ubbelohde viscosimeter).

The present invention can also be used to carry out all sorts of biological conversions using microorganisms. For instance, fermentation reactions in which yeast cells are used may be carried out in the reactor of the present invention.

If one of the compounds in the multi-phase reaction mixture of the present invention consists of solid particles, these particles should be as small as possible to minimize the distortion of the Dean vortices. The larger the particle, the more it distorts the Dean vortices. Furthermore, the shape of the particles is important. For example, a flat particle will more easily get stuck on the surface of the channel than a spherical particle.

A solid particle will be kept in suspension flowing through the channel of the present invention when the gravitational force working on the particle (which forces the solid particles out of suspension) is canceled out by the other forces working on the solid particle. The most important of these other forces is the frictional force. The gravitational force and frictional force can both be expressed by the size of the particle:

$$F_g \leq F_f \quad (2)$$

$$F_g = (4/3) \cdot \pi \cdot (r_{particle})^3 \cdot \Delta \rho \cdot g \quad (3)$$

$$F_f = 6\pi \cdot \eta \cdot (r_{particle}) \cdot v \quad (4)$$

wherein: $F_g$ is the gravitational force on the particle (N);
$F_f$ is the frictional force on the particle (N);
$r_{particle}$ is the characteristic radius of the particle (m);
$\Delta \rho$ is the difference in density between the particle and the fluid in which it is suspended $\{kg/m^3\}$;

g is the gravitational acceleration $(m/s^2)$;

$\eta$ is the dynamic viscosity of the fluid in which the particle is suspended (Pa s);

$\upsilon$ is the average fluid velocity through the channel (e.g. the flow rate in $m^3/s$ divided by the cross-sectional area in $m^2$);

Combining the equations above, the size of solid particles sustained by the present invention can be defined by the following formula:

$$r_{particle} \leq \sqrt{((18 \cdot \eta \cdot \upsilon)/(4 \cdot \Delta \rho \cdot g))} \qquad (5)$$

For example, for a suspension of alumina particles in water $\eta=1.0 \cdot 10^{-3}$ Pa·s and $\Delta\rho=800$ kg/m³. Using an average fluid velocity of $\upsilon=0.45$ m/s, the size of the characteristic radius of the alumina particle may not be larger than 160 micrometer to stay in suspension.

Figure 2:
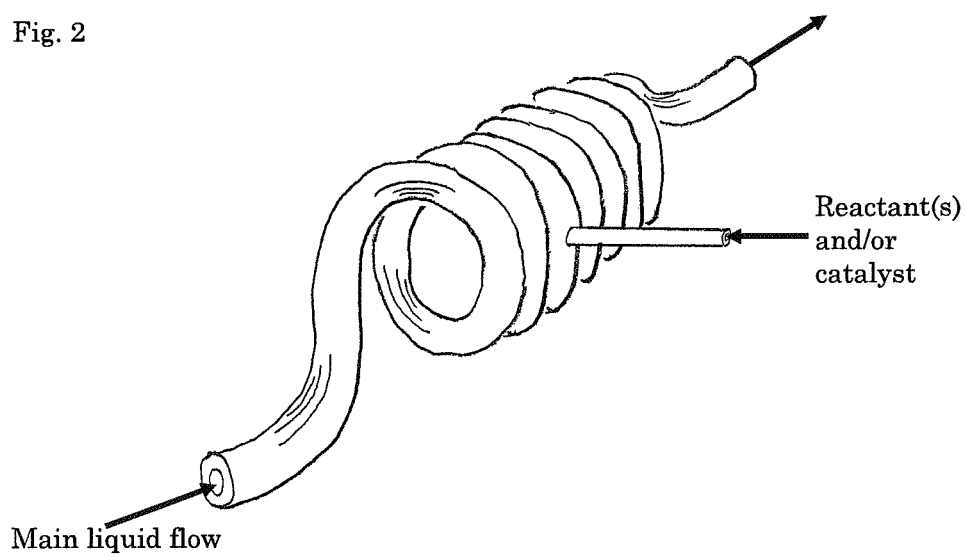
FIG. 2 shows a capillary injector attached to the curved channel in the form of a spiral in accordance with the invention.

One or more of the reactants and/or the catalyst should preferably be combined when the Dean vortices have already developed in the main flow of liquid. In this way it can be prevented that the reaction starts under sub-optimal conditions, viz. in the absence of Dean vortices. Furthermore, possible coagulation of the particles in the multi-phase reaction is also prevented in this way. Preferably, the reactant(s) and/or catalyst are brought together at the moment they enter the curved channels. More preferably, the reactant(s) and/or catalyst are brought together in the reactor when the Dean vortices are already established, e.g. after the channel has made at least two or more windings. In case of heterogeneous catalysis, it is most convenient to include the catalyst particles in the liquid feed and to inject the reactants (gas or liquid) in the liquid feed at a predetermined position inside the tube reactor, e.g. using a capillary injector. An example of such a configuration is schematically shown in FIG. 2.

An alternative way to prevent the reaction from starting in the absence of Dean vortices and minimize their disturbance is to lower the temperature of the multi-phase reaction mixture until it has passed through the first two windings of the channel. Then the temperature is increased to provide the activation energy to start the reaction.

Excellent control is obtained over the reaction progress when the channels are on the outside in contact with a heat-exchanging substance, usually a liquid. Especially when a reaction is exothermic or endothermic, the multi-phase reacting mixture will change in temperature going through the curved channels. This may result in local hot- or cold-spots, which is especially important for side-reactions that may occur in the reactor when the temperature is locally too high. Furthermore, local areas of decreased temperature may result in less than full conversion of reactants or suboptimal conversion. The radial mixing by the Dean vortices in combination with the heat-exchanging substance results in a uniform temperature across the reactor tube and temperature control over the entire reactor. For this purpose, the reactor is preferably spiraled, which enlarges the area that is in contact with the heat-exchanging substance, thus allowing for a maximum amount of heat transfer.

Preferably, the reactor of the present invention is placed in a mantle containing the heat-exchanging substance. In this way, the properties of the reaction product can be actively controlled by ensuring full conversion of reactants and suppressing heat induced side reactions. In one example, an exothermic reaction was conducted using the present invention in combination with a flowing heat exchanging substance. The curved channels were for this purpose placed inside a mantle containing the heat exchanging substance. In this way, the multi-phase reaction mixture could be brought to reaction temperature already in the first part of the reactor. Thus the reaction started soon after entering the reactor. Moreover, once the reaction had started and generated extensive reaction heat, this heat could be removed efficiently because of the excellent heat exchange properties of the reactor in the present invention. Thus the reacting mixture was kept at a constant reaction temperature and autocatalysis.

In this way, a high initial reaction rate could be combined with uniform reaction temperature. Thus, no hot-spot induced side reactions were observed and the reaction was more complete at the end of the reactor, therefore a smaller part of the reaction took place in the collection vessel, which resulted in a more stable and/or uniform product.

The properties of the product may further be controlled by varying the residence time of the volume elements inside the reactor. The residence time can be varied for example by adjusting the flow rate or varying the length of the reaction tubes.

Figure 4:
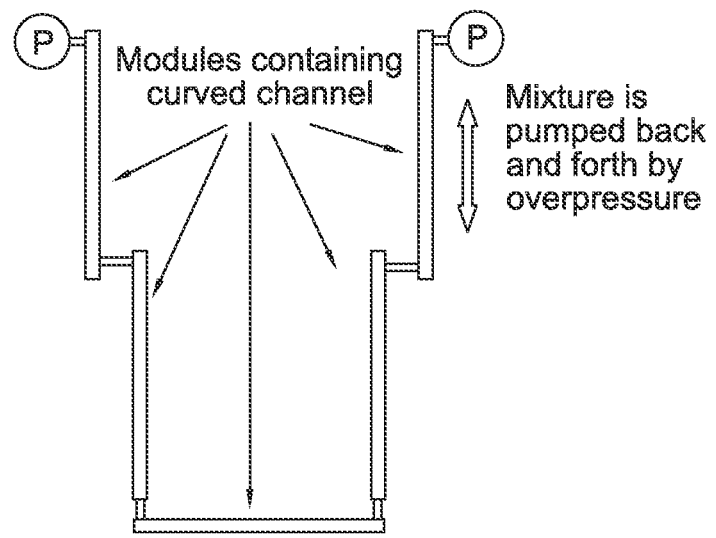
FIG. 4 is a schematic diagram of a u-shaped set up of a channel in which five modules, each including a spiraled channel, are used to contain fluids in accordance with the invention.

In another embodiment, the retention time is varied by using the reactor of the present invention (also referred to as Helix reactor) in a loop set up where a pump connects the beginning and the end of the Helix reactor. In this way the Helix reactor is used as a batch reactor in which retention time can be very easily varied. The helix reactor can also be used as a batch reactor when the beginning and the end of the reactor are alternatingly provided with overpressure which results in the back and forward moving of the liquid which is present in the reactor. The turn in flow direction disturbs the Dean vortices, therefore the length of the one-way flow should be maximized. The reacting mixture should preferably pass a minimum of 25 windings before the direction of the flow is reversed. This set-up is schematically depicted in FIG. 4, showing a u-shaped set up in which five modules, each comprising a spiraled channel are used to contain the fluids in accordance with the invention. The pressure is alternatingly varied at the points indicated by "P". As a result, the fluid contents of the tubes undergoes a swinging motion. In this way, no external forces disturbing the Dean vortices are applied to the reacting mixture since no pump comes in contact with the liquid in the reactor. Thus the processed reacting mixture is subject to the mildest conditions.

The invention claimed is:

1. Process for carrying out chemical reactions, comprising a step wherein a reacting mixture comprising at least two different physical phases, wherein at least one of these phases is liquid, is subjected to the action of Dean vortices, which Dean vortices result from said liquid flowing in a non-pulsating way through a channel having at least two windings, wherein the channel comprises for at least a fraction of its total length a smooth inner surface, wherein the channel is a tube in the shape of a spiral, and the relative surface roughness $R_{a,r}$ of the inner surface of the channel is smaller than 0.1, and the spiral comprises 10 or more windings.

2. Process according to claim 1, wherein said spiral comprises more than 10 and less than 10000 windings.

3. Process according to claim 1, wherein said reacting mixture is a three-phase or more-phase system, which comprises compounds in the liquid, gas and solid phase.

4. Process according to claim 1, wherein said chemical reaction is a mini-emulsion polymerization reaction, and wherein said reaction mixture comprises mini-emulsion particles comprising monomer and at least one initiator molecule.

5. Process according to claim 4, wherein the compound in the reaction mixture is a particle with a characteristic radius defined as:

$$r_{particle} \leq \sqrt{((18 \cdot \eta \cdot \upsilon)/(4 \cdot \Delta \rho \cdot g))}$$

wherein: $\Delta\rho$ is the difference in density between the particle and the fluid in which it is suspended (kg/m$^3$); g is the gravitational acceleration (m/s$^2$); $\eta$ is the viscosity of the fluid in which the particle is suspended (Pa·s); and $\upsilon$ is the average fluid velocity through the channel (m/s).

6. Process according to claim 1 wherein the chemical reaction is hydrogenation, oxidation or hydroformylation.

7. Process according to claim 1, wherein said reaction mixture is forced through said channel by applying a non-pulsating pressure gradient, e.g. resulting from a non-pulsating pump, gas pressure or gravitational forces.

8. Process according to claim 1, wherein the components from the liquid phase and at least part of the components from the other physical phase or phases are combined inside said channel, and wherein preferably the reactants are brought together in the channel after the channel has made at least two or more windings.

9. Process according to claim 1, wherein the temperature of the multi-phase reaction mixture is increased after it has passed through the first two windings of the channel.

10. Process according to claim 1, wherein the effluent of the reactor is at least partly recycled to the reactor entrance to increase residence time.

11. Process according to claim 1, which comprises the step of applying alternating pressure at the beginning and/or the end of the reactor, resulting in back and forth flow of the reaction mixture where the minimum windings passed per flow direction is 25.

12. Apparatus for carrying out the process according to claim 1, the apparatus having an inside and outside, comprising a spiraled tube having more than two windings, the tube having a smooth inner surface, wherein in the second or higher winding an opening is present through which fluids can be fed, wherein the opening is preferably in the form of a capillary tube, wherein the spiraled tube is on the outside of the apparatus in contact with a heat-exchanging substance, wherein the relative surface roughness $R_{a,r}$ of the inner surface of the channel is smaller than 0.1.

\* \* \* \* \*